INVENTORS,
ROBERT M. DUNN &
DAVID R. HADDEN JR.
BY Harry M. Saragovitz
Edward J. Kelly, Herbert Berl
& Julian C. Keppler
ATTORNEYS INVENTORS,
ROBERT M. DUNN &
DAVID R. HADDEN JR.
BY Harry M. Saragovitz
Edward J. Kelly, Herbert Berl
& Julian C. Keppler
ATTORNEYS INVENTOR.
ROBERT M. DUNN &
DAVID R. HADDEN JR.
BY Harry M. Saragovitz
Edward J. Kelly, Herbert Berl
& Julian C. Keppler
ATTORNEYS

United States Patent Office 3,493,939
Patented Feb. 3, 1970

3,493,939
PRIORITY SEQUENCING DEVICE
Robert M. Dunn and David R. Hadden, Jr., Eatontown, N.J., assignors to the United States of America as represented by the Secretary of the Army
Filed Apr. 10, 1967, Ser. No. 629,824
Int. Cl. G11c *15/00;* H03k *3/286*
U.S. Cl. 340—173 8 Claims

ABSTRACT OF THE DISCLOSURE

A priority sequence storage device for writing priority information from an external memory into a memory array in the order of priority of the incoming words, the priority of which is represented by a combination of priority bits and characterized in that a word of given priority already stored in the memory array takes precedence over an incoming word of the same priority, wherein a control level is supplied to the memory array and is caused to travel through said array along a path, and to emanate from said array at a position, which path and position depends upon the relative priority of the external information and any information already stored in said memory array so that the incoming words are written in the proper order of priority into said memory array and so that priority words in said memory array can be read out in the order of priority.

BACKGROUND OF THE INVENTION

In data processing applications it often is desirable to store items of information in the storage location in the order of priority. In many instances, the priority order has been established by the programmer. Such a software approach can result in complex programs which may have to be revised with changes in incoming information. In accordance with the invention, the information is written simply and inexpensively into the storage array in order of priority and the information can be read out quite simply in the proper order. This hardware approach is preferable to the programming approach and to certain systems of the prior art in which the information is written into storage in random fashion and then must be retrieved in order of precedence by somewhat elaborate and time-consuming controlled searching techniques.

SUMMARY OF THE INVENTION

The device of the invention includes a memory array with *m* word positions or storage locations, each word position consisting of *n* bits arranged in order of significance. The memory array has *n* cells for each word position in the memory array, or a total of *mn* cells. Each cell in a given word position includes a J–K type flip flop which stores the appropriate bit or character for the given word. For example, for a word 1010 stored in a given word position of the memory array, the assertion outputs of the J–K flip flop of the four cells of that word position would be 1, 0, 1, 0 starting with the cell of the most significant bit. Consequently, the corresponding negation outputs of these flip flops would be 0, 1, 0, 1, respectively. All cells of a given word position include common write, read (shift down) and shift up buses. All cells of a given bit position receive the assertion and negation outputs of the corresponding bit of a word located externally of the memory array which one desires to write into the memory array. Each of the cells comprises circuit logic for implementing an algorithm which will now be explained. Starting at the most significant bit, a comparison is made between the most significant bit of the external word and the most significant bit of all words in the memory array. If there is a disagreement in a given word, the memory cell of the most significant bit of the given word position will produce a block level which is supplied to all succeeding cells in that word position. The second bit of the external word is compared in like fashion with the second bits of the words in the memory array, and so on, for other bits. A pattern of block levels thus will be established, each block level from the given cell being transferred to the cells of the same word position and all bit positions of lower significance.

In writing an external word into the memory array, a control level is supplied to the cell of the most significant bit and least significant word position. The logic circuitry in this cell is such that, if a given bit of the external word is ZERO, the control level will be transferred across the cell to the cell of the next least significant bit in that word position. In other words, the cell logic circuitry is such that, if a given bit of the external word is ZERO, the control level will move across exactly one bit in the memory array without moving downward. If there is a one in a bit of the external word, the control level will be directed downwardly from the memory array cell corresponding to that bit and to that word position under consideration, and will be transferred to the cell of the same bit position and of the word position of next higher order of priority. The control level will continue to drop downwardly through all cells of that bit position until it either meets a cell in that bit position in the memory array which has a ONE in it or it meets a cell which contains a block level. When either of these conditions occur, the control level is transferred to the cell of the next least significant bit in that word position. In other words, if there is a ONE in the external word, the control level will drop until it either meets another ONE in the memory array or encounters a block, at which point the control level moves across one bit in the memory array.

The control level, after following a path through the memory array which will differ for different combinations of external word and words stored in the memory array, will emanate from a word position of the memory array which is of immediately higher priority than the word position into which the external word should be written. The control level thus emanating from the storage array then is used to energize the write bus of the cells in the word position immediately preceding that from which the control level has emanated. The level on the write bus, together with the assertion or negation output from the cell of the external memory word bits, will enable a gate for actuating either the J or K input to the flip flop of that cell. The control level emanating from a cell in a given word position is applied to the shift up buses of cells of all word positions preceding the word position to be written into. The level on the shift up buses, together with either the assertion or negation output from the J–K flip flops of these cells will enable a gate for actuating either the J or K input to the preceding flip flop, depending upon the bit of the word to be shifted. Upon arrival of a clock pulse, transfer of words in all word positions preceding the word position written into the immediately preceding word position is accomplished. The characteristics of the clocked J–K flip flop of the cells is such that the words can be shifting directly and non-destructively from one word position to the adjacent word position without need for such devices as dummy registers. When it is desired to read a word from the memory array, a read level is applied to the shift down buses of the cells of all word positions and the read level on the shift down bus, together with either the assertion or negation output from the cell of the immediately preceding word position will enable the gate actuating either the J or K input to the flip flop of the corresponding cell depending upon the bit of the word to be shifted. Upon arrival of a clock pulse, transfer of all words to the succeeding word position is accomplished.

Summarizing, each word to be written into the memory array is inserted in the word position thereof which depends upon the priority of that word and those already within the memory array. The words are written into the memory array in their proper order of priority. When the memory array becomes full, an additional word to be written in must displace one of the words already in the full array. This new word will be written into the proper position in the order of priority and the word of lowest priority will be shifted off. When it is desired to read a word from the memory array, this may be done simply by applying the read level to the cells of the memory array, thereby shifting all words in the memory array one word position. The word nearest the output end of the memory array (the word of highest priority) will then be transferred into an output register. The next read level will transfer the word of next higher priority, which will be the word shifted into the word position of highest priority to replace the word previously read out.

DESCRIPTION OF THE PREFERRED EMBODIMENT

Figure 1A:
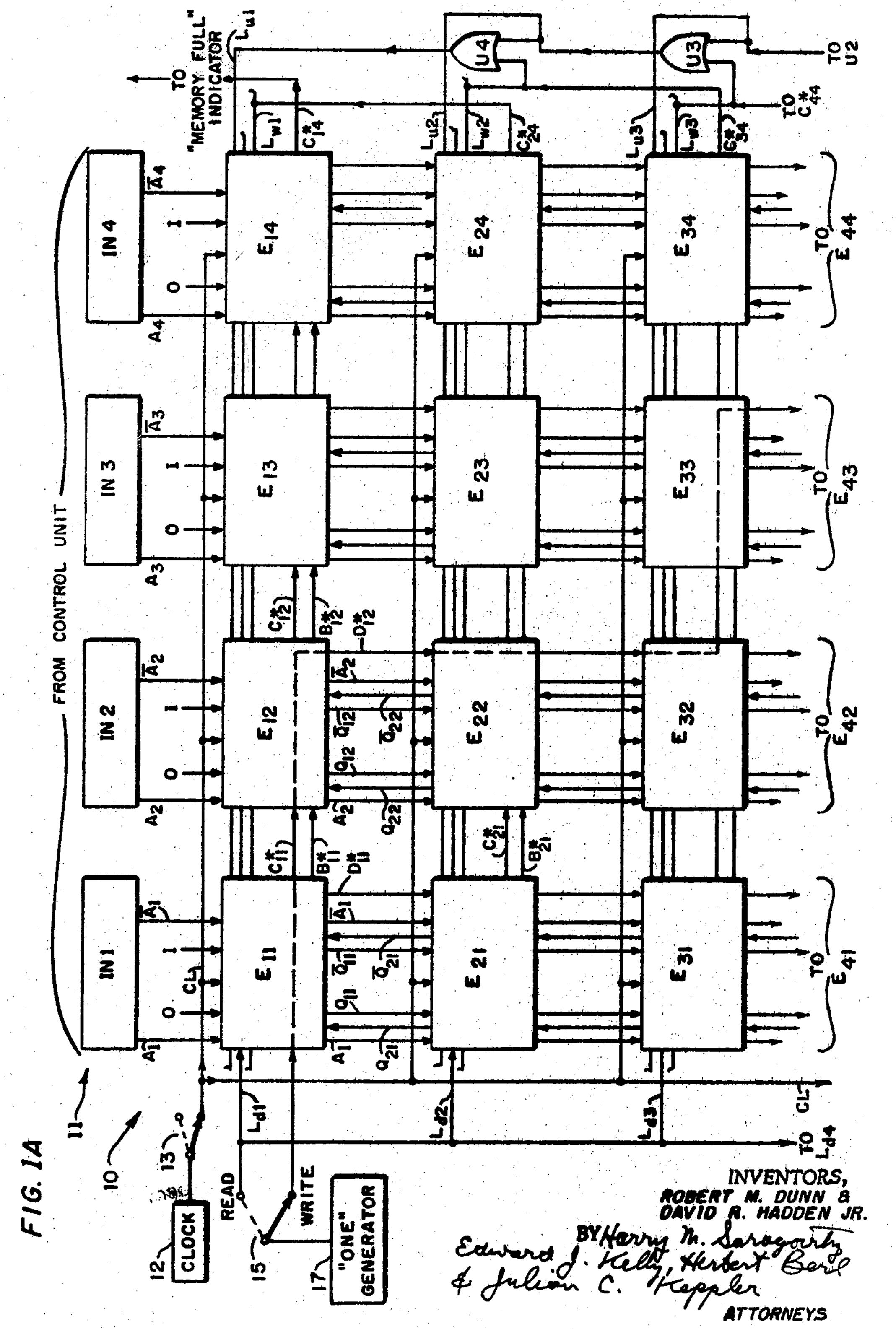
FIGS. 1A and 1B is a schematic diagram illustrating an embodiment of a priority sequencing device according to the invention.

In the example illustrated, it will be assumed that each priority word has four bits and that the memory array has a capacity of six priority words. The number of bits needed will depend on the number of word positions in the memory array. It should be understood that each priority word forms a portion of a complete word which may have any number of bits, including operation codes, and information bits. In other words, each word stored in the computer memory contains many bits of which four (in this example) serve to indicate the priority of that word. In order to simplify an examination of this application, only the priority indicating portion of the complete word, hereinafter referred to as the priority word, will be discussed. Whenever a priority word is transferred from one position to another in the memory array, it should be understood that the remaining portion of the word will shift along with the priority word.

For the sake of illustration, it will be assumed that the bits of the priority word from some external control unit are loaded into an external memory comprising registers IN1, IN2, IN3, and IN4 such that the register IN1 will contain the most significant priority bit and the register IN4 will contain the least significant bit. The word position nearest the input will be referred to as the first word position. The words are written from the external memory into the memory array 10 from top to bottom, in the illustration given, so that if the memory array is empty, the first word will be written into the last (in the example shown, the sixth) word position. As a result of the priority scheme of the invention, the word with the highest priority will be found in the sixth word position comprising cells $E_{61}$, $E_{62}$, $E_{63}$ and $E_{64}$. Similarly, the word with the next highest priority will be found in the penultimate (fifth) word position comprising cells $E_{51}$, $E_{52}$, $E_{53}$ and $E_{54}$, while the word with lowest priority (or, in the case of equal priority, the word last written into the memory array) will be located in the first word position which comprises cells $E_{31}$, $E_{12}$, $E_{13}$ and $E_{14}$.

The first arabic numeral in the cell designation represents the word position, while the second numeral represents the bit position. For example, cell $E_{34}$ is the cell of the third word position and the fourth (most significant) bit in the third word position. In referring generically to a cell $E_{mn}$, $m$ is the word position and $n$ is the bit position.

As a means for arriving at the desired circuit logic for implementing the priority positions, an algorithm has been derived. An arbitrary group of ordered binary coded bits is shown in Table I.

TABLE I

| External Word | 0 | 1 | 1 | 1 |
|---|---|---|---|---|
| 1st Word in Memory Array | 0 | 0 -- | 0 -- | 1 -- |
| 2nd " " " " | 0 | 0 -- | 1 -- | 0 -- |
| 3rd " " " " | 0 | 1 | 0 -- | 1 -- |
| 4th " " " " | 0 | 1 | 1 | 0 -- |
| 5th " " " " | 1 -- | 0 -- | 1 -- | 0 -- |
| 6th " " " " | 1 -- | 1 -- | 1 -- | 0 -- |

The uppermost 4-bit word represents the external priority word to be written into the memory array. The line and arrow thereon illustrates the path building of the external word through the memory array. In order to explain the technique for path building, comparison between the external word and the memory array must be established. The algorithm is as follows:

Starting at the most significant bit, a comparison is made between the first bit of the external word to be written into the memory array and the first bit of the first word in the memory array. If a word position in the memory array is empty, the registers of the bits of that word position will arbitrarily be set to zero, one (an assertion output of zero). If there is a disagreement between the first bit of the external priority word and the first bit of the first word in the memory array, said memory array bit receives a block. This block is indicated in Table I as a dash to the right of the bit. All following bits of that same memory array word will also receive blocks. The next comparison is made between the first bit of the external word and the first bit of the second word in the memory array, and so forth across the memory array. Similarly, the second bit of the external priority word is compared with the various second bits of the memory array. When the entire memory array has been thus examined and the necessary blocks inserted, a bit may now be directed through the memory array to accommodate the external word.

If the external bit is a zero, the path will move across exactly one bit without moving down. If, on the other hand, there is a one in the external word, the path will drop until it either meets another one in the memory array or encounters a block. At this point, the path moves across one bit. The path across moves over the block or bit being compared.

Figure 1B:
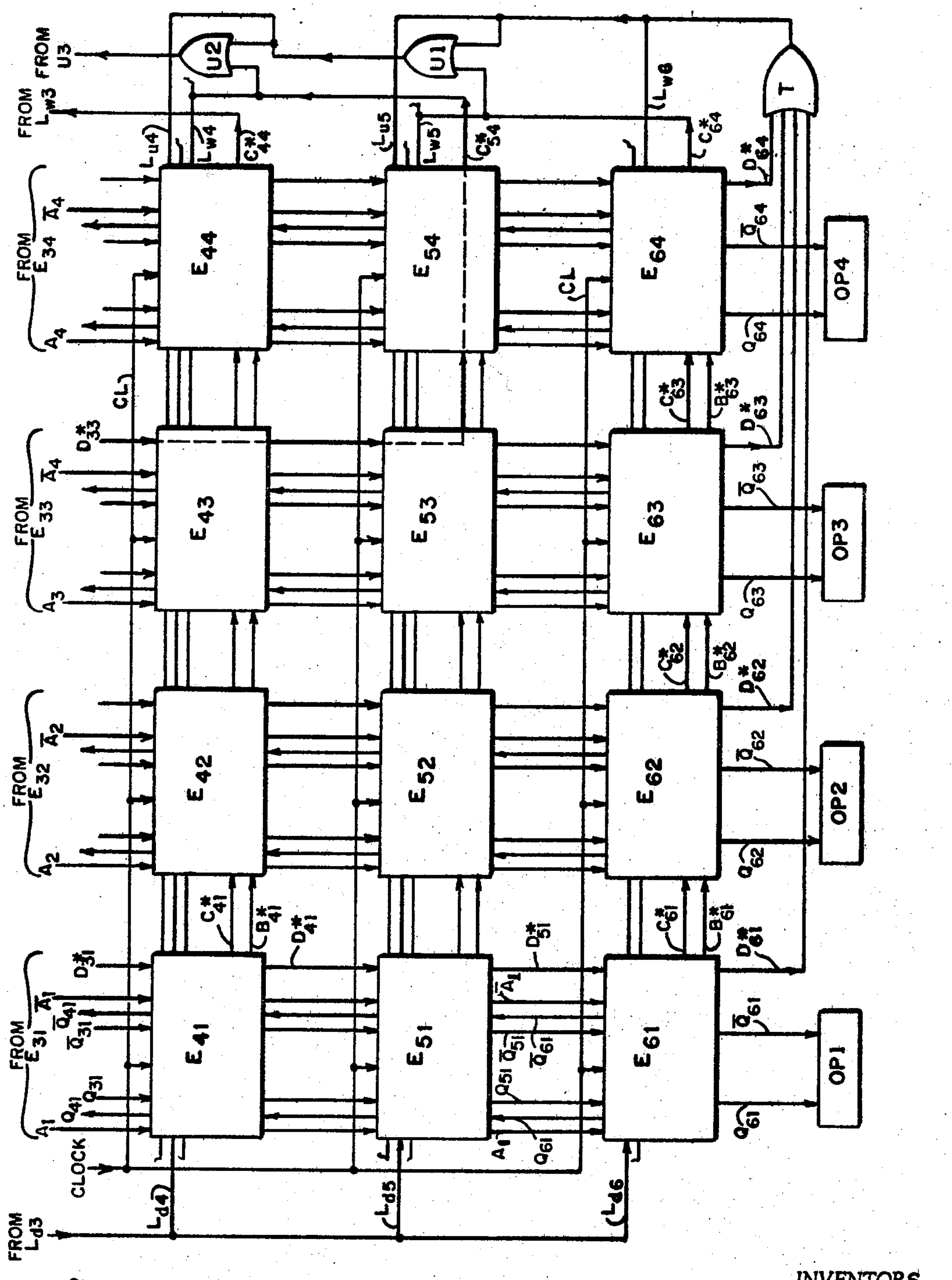
Figure 2:
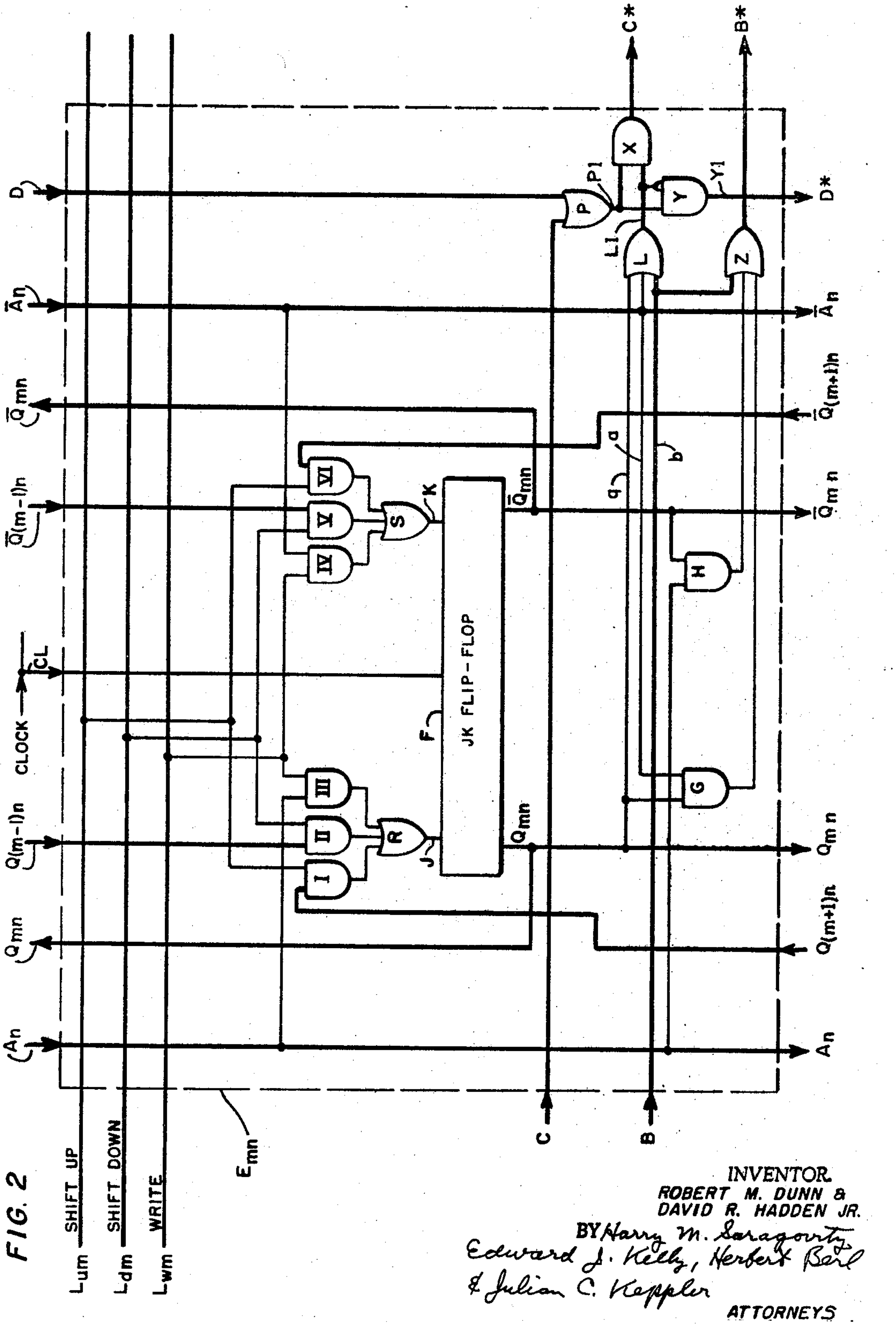
FIG. 2 is a diagram showing the contents of a conventional cell used in the system of FIGS. 1A and 1B.

Before describing the basic system of FIG. 1 in detail, reference will be made to FIG. 2 which is a schematic representation of a cell $E_{mn}$ of the memory array. First of all, however, it should be pointed out that there are some modifications made in certain of these cells. For example, all cells of the first word position, namely, cells $E_{11}$, $E_{21}$, $E_{31}$, $E_{41}$, $E_{51}$ and $E_{61}$ have no B input to gates L and Z. Finally, all cells of the fourth bit position, namely, cells $E_{14}$, $E_{24}$, $E_{34}$, $E_{44}$, $E_{54}$ and $E_{64}$, need have no G, H and Z gates, since there is no need for B* outputs from these cells. Cells $E_{22}$, $E_{23}$, $E_{32}$, $E_{33}$, $E_{42}$, $E_{43}$, $E_{52}$ and $E_{53}$ are exactly as shown in FIG. 2.

The lines $A_n$ and $\overline{A}_n$ to the cell $E_{mn}$ carry available assertion and negation outputs of the external word register corresponding to the $n$th bit. For example, if the word in the external register 11 were 0111, the $A_n$ and the $\overline{A}_n$ levels from external registers IN2, IN3 and IN4 would be one and zero, respectively, while the $A_n$ and $\overline{A}_n$ levels from external register IN1 would be zero and one respectively. The $A_n$ and the $\overline{A}_n$ levels are supplied to all memory cells of the *n*th bit.

Also entering each cell $E_{mn}$ except for first word cells as previously indicated, is a D line which is connected to the D* output line of the cell of the same bit position but of the immediately preceding word position; that is, line D of cell $E_{mn}$ is connected to the D* output of cell $E_{(m-1)n}$. Likewise, each cell $E_{mn}$, except for the first bit cell, includes a B and a C input line which is connected to the respective B* and C* output lines of the cell of the same word position but of the immediate preceding bit position. In other words, lines B and C of cell $E_{mn}$ both are connected to cell $E_{m(n-1)}$.

Each cell $E_{mn}$ includes a register F which may be in the form of a J–K flip flop having J and K input lines and corresponding output lines $Q_{mn}$ and $\overline{Q}_{mn}$. These output lines proceed from cell $E_{mn}$ and are connected to input lines $Q_{(m+1)n}$ and $\overline{Q}_{(m+1)n}$, respectively, of cell $E_{(m-1)n}$; in the case of the last word cell, the output lines $Q_{mn}$ and $\overline{Q}_{mn}$ are connected to the appropriate input lines of output registers OP1, OP2, OP3 and OP4. The $Q_{(m+1)n}$ and $\overline{Q}_{(m+1)n}$ lines from cell $E_{(m+1)n}$ are connected to AND gates I and VI, respectively, of cell $E_{mn}$. The other input to gates I and VI is connected to the SHIFT UP bus $L_{um}$ of cell $E_{mn}$. The $Q_{(m-1)n}$ and $\overline{Q}_{(m-1)n}$ lines from cell $E_{(m-1)n}$ are connected to AND gates II and V, respectively. The other input to gates II and V are connected to SHIFT DOWN but $L_{dm}$ of cell $E_{mn}$.

The input lines $A_n$ and $\overline{A}_n$ are connected to respective AND gates III and IV of cell $E_{mn}$. The other inputs to gates III and IV is connected to the WRITE bus $L_{wm}$ of cell $E_{mn}$. It will be noted that there is a separate SHIFT UP, SHIFT DOWN and WRITE bus for each word position of the memory array and that a given one of these lines passes through all cells of a given word position.

The output line of AND gates I, II, and III of cell $E_{mn}$ are connected to an OR gate R and the output line of OR gate R is connected to the J side of flip flop F for cell $E_{mn}$. Similarly, the output lines of AND gates IV, V and VI of cell $E_{mn}$ are connected to an OR gate S and the output line of OR gate S is connected to the K side of flip flop F of cell $E_{mn}$.

A clock pulse CL is applied simultaneously to the flip flop F of all of the cells of the memory array 10 and any state transformations of a flip flop occur only upon receipt of such a clock pulse. The clock pulse may be derived from a single clock source 12 and can be applied to all flip flops by closing switch 13 at some interval following either movement of switch 15 to the READ or WRITE position.

If any of the following three conditions is met, a level will be available at a corresponding input or OR gate L of a given memory array cell $E_{mn}$. The first condition is the *n*th bit of the external word is a zero; if this condition exists, there will be an input level $\overline{A}_n$ on input line *a* of OR gate L of cell $E_{mn}$ and also to other input lines *a* of *n*th bit cells. The second condition is that the *n*th bit of the *n*th priority word at cell $E_{mn}$ is a one; if this condition exists, there will be an input level $Q_{mn}$ on input line *q* of OR gate L of cell $E_{mn}$. The third condition is that the bit on line $A_n$ of the external word, if any, and the same bit in the cell $E_{mn}$ of the memory array are different bits, there will be an input level B on input line *b* of OR gate L of cell $E_{mn}$.

An OR gate P is receptive of either (but never both) a C level from the cell $E_{m(n-1)}$ and of a D level from cell $E_{(m-1)n}$.The output on line P1 of OR gate P is applied to an AND Gate X which also receives the output of OR Gate L by way of line $L_1$. The output, if any, from OR gate X is referred to as C*. The condition for a C* level from any cell in the memory array then may be expressed by the following logical equation:

$$C^*=(C_{mn}+D_{mn})(Q_{mn}+\overline{A}_{mn}+B_{m(n-1)})$$

were $B_{m(n-1)}$ is the blocking level, if any, gate Z of the cell $E_{m(n-1)}$ presented to cell $E_{mn}$, $Q_{mn}$ is the affirmation output from flip flop F of cell $E_{mn}$ and $\overline{A}_{mn}$ is the negation output of the external word bit $A_n$ presented to cell $E_{mn}$ and $C_{mn}$ and $D_{mn}$ (only one of which is obtained for a given cell) are the levels obtained from the immediate preceding cell $E_{m(n-1)}$ and $E_{(m-1)n}$, respectively.

If one or more of three conditions is met, no level will appear at any of the inputs to OR gate L of cell $E_{mn}$. Firstly, if there is a ONE in the *n*th bit $A_n$ of the external priority word, there will be no input on input line *a* of OR gate L of cell $E_{mn}$. Secondly, if there is a ZERO in the *n*th bit of a word in the *n*th position of memory array 10, there will be no input on input line *q* of OR gate L of cell $E_{mn}$. Thirdly, if there is disagreement between the $(n-1)$th bit in the external word and the corresponding $(n-1)$th bit of the word in the memory array, that is, if one bit is a one and the other bit is a zero, there will be no input on line *b* of OR gate L of cell $E_{mn}$. The preceding remarks can be restated as follows: If all three of the following conditions occur simultaneously, there will be no output from gate L. First, the *n*th bit from the external memory is a one; second, $Q_{mn}$ is a zero; and third, $A_n$ and $Q_{mn}$ are different binary characters.

If the blocking level presented to a given cell $E_{mn}$ of the memory array 10 is represented by B from the cell $E_{m(n-1)}$, $\overline{Q}_{mn}$ is the negation output of the flip flop from cell $E_{mn}$ and $A_n$ is the affirmation output from the flip flop of the *n*th bit of the external word presented to cell $E_{mn}$, the condition for a D* level from cell $E_{mn}$ then may be expressed by the following logical equation:

$$D^*=(C+D)(Q_{mn}A_n\overline{B}_{m(n-1)})$$

where C and D are the input levels to cell $E_{mn}$ obtained from one or the other (but not both) of the respective output gates X and Y of the cell $E_{(m-1)n}$ or cell $E_{m(n-1)}$, as the case may be.

Whenever the Q output of flip flop F of cell $E_{mn}$ is a ONE and the *n*th external word bit is a ZERO, AND gate G will be enabled, as also will be OR gate Z, and a B* output will be obtained at cell $E_{mn}$. On the other hand, the output of the flip flop F to cell $E_{mn}$ is a ZERO and the *n*th digit of the external word is a ONE, AND gate H is enabled, as is also gate Z; again a B* output is obtained at cell $E_{mn}$, this input also will enable OR gate Z and a B* output will be obtained at cell $E_{mn}$. This is in line with the statement made previously that a block pulse, once obtained, is produced for all other bits of the word in the memory array.

If either a C or D pulse level appears at cell $E_{mn}$ and an output is available at OR gate L, under conditions already described, AND gate X is enabled and a C* output is available at cell $E_{mn}$. If, however, there is no output at OR gate L coincidentally with the presence of either a C or D level at cell $E_{mn}$ inhibit gate Y is enabled and a D* output is obtained at cell $E_{mn}$. It will be noted that only one of the gates X and Y of any particular cell $E_{mn}$ can be enabled at any time. In other words, if a C* level emanates from gate of cell $E_{mn}$, there can be no D* level emanating via gate Y of the same cell. The decision as to which path through a cell in word position *m* and bit position *n* in the control level from generator 17 will pass will be determined on the basis of comparison of the *n*th bit in the external priority word and the corresponding *n*th bit of the word *m* in the memory array.

When it is desired to SHIFT information down the memory array, switch 15 is moved to the READ position and a one level from generator 17 is supplied to all SHIFT DOWN lines of the memory array. In order to explain the SHIFT DOWN or READ operation, it will be assumed that the last (sixth) word position in the memory array contains the word 0101 and that it is desired to READ this word out of the memory array into the output registers OP1 to OP4. It will further be assumed that the preceding word position (fifth position) of the memory array is empty. Consequently, the aforementioned outputs of the flip flops of the fifth word position of the memory array will be 0000. If, now, the READ (SHIFT DOWN) line $L_{dm}$ is energized by moving switch 15 to the READ position, the operation will be as indicated in the following Table III. As an aid in explaining Table III, Table II will first be presented showing the operation of the J–K flip flop in the various cells of the memory array.

TABLE II

| Initial State Q | Input Signal J | Input Signal K | Resulting |
|---|---|---|---|
| 1 | 1 | 0 | 1 |
| 1 | 0 | 1 | 0 |
| 0 | 1 | 0 | 1 |
| 0 | 0 | 1 | 0 |

TABLE III

| Cell $E_{mn}$ | Initial $Q_{mn}$ | $Q_{(m-1)n}$ | Bus Energized | Register AND Gate Enabled | Register OR Gate Enabled | FF Input Activated | Resulting $Q_{mn}$ |
|---|---|---|---|---|---|---|---|
| $E_{61}$ | 0 | 1 | $L_{dm}$ | V | S | K | 0 |
| $E_{62}$ | 1 | 1 | $L_{dm}$ | V | S | K | 0 |
| $E_{63}$ | 0 | 1 | $L_{dm}$ | V | S | K | 0 |
| $E_{64}$ | 1 | 1 | $L_{dm}$ | V | S | K | 0 |

Upon arrival of a clock pulse CL to the flip flops of the cells of the memory array, the affirmation outputs of all cells of the last (sixth) word position will be 0000, indicating that the priority word previously in the memory array (viz., 0101) has been read out of the memory array. The bits formerly in word position 6 then are transferred to corresponding output registers 01 to 04. The word 0000 remains at the sixth word position of the memory array until the next execution command level (SHIFT DOWN, SHIFT UP or WRITE) occurs at one of the buses $L_{dm}$, $L_{um}$ or $L_{wm}$.

Having emptied the memory array, it will be assumed further that the priority word 1101 is to be written into the memory array. The switch 15 is placed in the WRITE position and the control level from generator 17 appears at the C input line of the first cell $E_{11}$. As previously noted, none of the other first bit cells have such a C input line. This C level from generator 17 forms an input to OR gate P of cell $E_{11}$, and, although cell $E_{11}$ has no D input, an output level appears at output line P1 of OR gate P. A ZERO and a ONE is applied to gates II and V, respectively, of all first word cells. Gates II and V have received an input level from SHIFT DOWN line $L_{dm}$ during the prior READ operation and the gates V and S are enabled. The K side of flip flop F of cell $E_{11}$ will be activated upon receipt of clock pulse CL and $Q_{11}$ and $\overline{Q}_{11}$ of cell $E_{11}$ will be a ZERO and a ONE, respectively. Likewise, gates V and S of the first word cells $E_{12}$, $E_{13}$, and $E_{14}$ will be enabled, the K side of the flip flops of these cells will be activated and $Q_{mn}$ of these cells will be a ZERO. Since $Q_{11}$ is ZERO, there is no input on line *q* of OR gate L of cell $E_{11}$. Likewise, there is no input on line *q* of gate L of cells $E_{12}$, $E_{13}$ and $E_{14}$. Moreover, since the first bit from the external memory flip flop is a ONE, $\overline{A}_{11}$ is ZERO and there is no input on line *a* of OR gate L of cell $E_{11}$. The same is true for cells $E_{12}$, $E_{13}$ and $E_{14}$. It should be noted that there is no B input to any of the first bit cells of the memory array; hence, there is no input on line *b* of OR gate L of cell $E_{11}$. In other words, gate L of cell $E_{11}$ is closed and no output appears on OR gate line L1. It follows that the AND gate X is not enabled and that no output level C* appears at cell $E_{11}$. Since there is an input on line P1 of AND gate Y, together with no input on inhibit line L1 of AND gate Y, conditions are proper for an output level to appear on output line Y1 of gate Y of cell $E_{11}$. Consequently, a level appears at the D* output line from cell $E_{11}$.

The incoming control level from generator 17 thus moves downwardly from cell $E_{11}$ and is transferred to the first bit cell $E_{21}$ of the second word position. In other words, the D* output from cell $E_{11}$ now becomes a D input to cell $E_{21}$ and passes OR gate P of cell $E_{21}$. Since $Q_{11}$, $Q_{12}$, $Q_{13}$ and $Q_{14}$ are all ZERO, there can be no output from AND gate G of respective cells $E_{11}$, $E_{12}$, $E_{13}$ and $E_{14}$. Likewise, since $A_1$, $A_2$, $A_3$ and $A_4$ are all ZERO, there can be no output from AND gate H of respective cells $E_{11}$, $E_{12}$, $E_{13}$ and $E_{14}$. With no input from line *b* of OR gate Z of cell $E_{11}$, there can be no B* output from cell $E_{11}$. Consequently, there is no B input to cell $E_{12}$ or to cells $E_{13}$ and $E_{14}$ and there can be no input to line *b* of OR gate L of cells $E_{12}$, $E_{13}$ and $E_{14}$. In other words, OR gate L of cells $E_{12}$, $E_{13}$ and $E_{14}$ is closed and OR gate Y of these cells necessarily is closed. The input control level from generator 17, therefore, cannot cross cell $E_{11}$ to any of the other cells $E_{12}$, $E_{13}$ and $E_{14}$ of the first word position, since gate X of these cells is closed. Since the flip flops of all cells have been reset to the ZERO condition as a result of previously reading out all words from the memory array, the Q output of cell $E_{21}$ is ZERO and no input appears on line *q* of gate L of cell $E_{21}$. Since the first bit of the external word is a ONE, the level at line $\overline{A}_1$ is a ZERO and there is no input on line *a* of gate L of cell $E_{21}$. There is no B input to cell $E_{21}$. Therefore, OR gate L of cell $E_{21}$ is closed and, as in the case of cell $E_{11}$, the AND gate X of cell $E_{21}$ is closed and gate Y of cell $E_{21}$ is enabled. An output D* thus emanates from cell $E_{21}$ and is transferred by way of input line D of cell $E_{31}$ to the OR gate P of cell $E_{31}$.

It is now evident that there will be no output on line L1 of OR gate L of cells $E_{31}$, $E_{41}$, $E_{51}$ and $E_{61}$, since all $Q_{mn}$ outputs of these cells are ZERO, the $\overline{A}_1$ input to all of these cells is ZERO and there is no B input to any of these cells. Consequently, the AND gate X of all these cells will be closed and the AND gate Y of all these cells will be enabled. As a result, the control level from generator 17 proceeds down through all of the first bit cells of the memory array and emanates from the D* line of cell $E_{61}$. This D* output passes OR gate T and energizes the WRITE bus $L_{w1}$ of the first word position. The writing operation may be described by reference to Table IV.

TABLE IV

| Cell $E_{mn}$ | Priority Word Bit $A_n$ | Initial $Q_{mn}$ | Bus Energized | AND Gate Enabled | OR Gate Enabled | F Input Activated | Resulting $Q_{mn}$ |
|---|---|---|---|---|---|---|---|
| $E_{61}$ | 1 | 0 | $L_{w6}$ | III | R | J | 1 |
| $E_{62}$ | 1 | 0 | $L_{w6}$ | III | R | J | 1 |
| $E_{63}$ | 1 | 0 | $L_{w6}$ | III | R | J | 1 |
| $E_{64}$ | 0 | 0 | $L_{w6}$ | IV | S | K | 0 |

Initially, the word 0110 is stored in word position four of the memory array. In other words, the active lines from the cells of $E_{41}$, $E_{42}$, $E_{43}$ and $E_{44}$ are $\overline{Q}_{41}$, $Q_{42}$, $Q_{43}$ and $\overline{Q}_{44}$, respectively. These outputs become inputs to the respective cells of the immediately preceding (third) word position; that is, the Q outputs of cells $E_{41}$, $E_{42}$, $E_{43}$ and $E_{44}$ become the Q inputs to AND gates I or VI of respective cells $E_{31}$, $E_{32}$, $E_{33}$ and $E_{34}$. The SHIFT UP bus $L_{u3}$ also provides an input to AND gates I and VI of cells $E_{31}$, $E_{32}$, $E_{33}$ and $E_{34}$. The gates VI and S of cells $E_{31}$ and $E_{34}$ are enabled and a K input occurs at the flip flop F of cells $E_{31}$ and $E_{34}$. Similarly, gates I and R of cells $E_{32}$ and $E_{33}$ are enabled and a J input occurs at the flip flop F of cells $E_{32}$ and $E_{33}$. Since the word stored in the third word position of the memory was 0101, we have the following flip flop operation table.

TABLE VI

| Cell | Initial $Q_{3n}$ | Input J | Input K | Resulting $Q_{3n}$ |
|---|---|---|---|---|
| $E_{31}$ | 0 | 0 | 1 | 0 |
| $E_{32}$ | 1 | 1 | 0 | 1 |
| $E_{33}$ | 0 | 1 | 0 | 1 |
| $E_{34}$ | 1 | 0 | 1 | 0 |

It is evident that the flip flop of cell $E_{33}$ of the third word position has changed state, so that the word now appearing in the third word position is 0110. This is the word that previously was in the fourth word position; in other words, the word previously in the fourth word position has been shifted up to the third word position of the memory array.

Similarly, the word 0010 in the third word position must be shifted up to the second word position. This is done by placing the control level from C* line of cell $E_{54}$ on SHIFT UP bus $L_{u2}$ of the second word position by way of OR gates U1, U2 and U3. Now the inputs to the AND gates I and VI of cells $E_{21}$, $E_{22}$, $E_{23}$ and $E_{24}$ emanating from respective cells $E_{31}$, $E_{32}$, $E_{33}$ and $E_{34}$ are 0, 1, 0 and 1. Consequently, gates VI and S of cells $E_{21}$ and $E_{23}$ are enabled and the K side of the flip flop of these two cells is activated. Likewise, gates I and R of cells $E_{22}$ and $E_{24}$ are enabled and the J input of the flip flop of these cells is activated. The following operation Table VII then obtains:

TABLE VII

| Cell | Initial $Q_{2n}$ | Input J | Input K | Resulting $Q_{2n}$ |
|---|---|---|---|---|
| $E_{21}$ | 0 | 0 | 1 | 0 |
| $E_{22}$ | 0 | 1 | 0 | 1 |
| $E_{23}$ | 1 | 0 | 1 | 0 |
| $E_{24}$ | 0 | 1 | 0 | 1 |

The resulting word now in the second word position is 0101. This is the word that was in the third word position, indicating that the word in the third word position has been shifted up one word position to the second word position.

It is now evident that the word formerly in the second word position, namely, 0010, will be shifted up to the first word position owing to the arrival at SHIFT UP bus $L_{u1}$ of the control level from the C* output of cell $E_{54}$ by way of gates U1 to U4. The word formerly in the first word position, that is, the word of lowest priority, now is removed from the memory array.

If the external word to be written into the memory array is of the same priority as that of a given word already in the memory array, it can be shown that the external word will be read into the memory word position immediately preceding that occupied by said given word. In other words, a word of a given priority already in the memory array takes precedence over the external word of equal priority. This can be shown by means of the algorithm chart of Table VIII and Table IX.

TABLE VIII

| External Word | 0 | 1 | 0 | 1 |
|---|---|---|---|---|
| 1st Word in Memory Array | 0 | 0 | 0 | 1 |
| 2nd " " " " | 0 | 0 | 1 | 0 |
| 3rd " " " " | 0 | 1 | 0 | 1 |
| 4th " " " " | 1 | 0 | 0 | 0 |
| 5th " " " " | 1 | 0 | 1 | 0 |
| 6th " " " " | 1 | 1 | 1 | 0 |

TABLE IX

| $E_{mn}$ | $Q_{mn}$ | $\overline{Q}_{mn}$ | $A_n$ | $\overline{A}_n$ | $G_{mn}$ $Q_{mn}\cdot\overline{A}_n$ | $H_{mn}$ $\overline{Q}_{mn}\cdot A_n$ | $B_{mn}$ $B^*_{(m-1)n}$ | $B^*_{mn}$ $B_{(m-1)n}\cdot G_{mn}\cdot H_{mn}$ | $C_{mn}$ $C^*_{(m-1)n}$ | $D_{mn}$ $D^*_{m(n-1)}$ | $P_{mn}$ $C_{mn}+D_{mn}$ | $L_{mn}$ $Q_{mn}+\overline{A}_n+B_{mn}$ | $\overline{L}_{mn}$ | $C^*_{mn}$ $L_{mn}\cdot(C_{mn}+D_{mn})$ | $D^*_{mn}$ $\overline{L}_{mn}\cdot(C_{mn}+D_{mn})$ |
|---|---|---|---|---|---|---|---|---|---|---|---|---|---|---|---|
| $E_{11}$ | 0 | 1 | 0 | 1 | 0 | 0 | --- | 0 | 1 | --- | 1 | 1 | 0 | 1 | 0 |
| $E_{12}$ | 0 | 1 | 1 | 0 | 0 | 1 | 0 | 1 | 1 | --- | 1 | 0 | 1 | 0 | 1 |
| $E_{13}$ | 0 | 1 | 0 | 1 | 0 | 0 | 1 | 1 | 0 | --- | 0 | 1 | 0 | 0 | 0 |
| $E_{14}$ | 1 | 0 | 1 | 0 | X | X | 1 | X | 0 | --- | 0 | 1 | 0 | 0 | 0 |
| $E_{21}$ | 0 | 1 | 0 | 1 | 0 | 0 | --- | 0 | --- | 0 | 0 | 1 | 0 | 0 | 0 |
| $E_{22}$ | 0 | 1 | 1 | 0 | 0 | 1 | 0 | 1 | 0 | 1 | 1 | 0 | 1 | 0 | 1 |
| $E_{23}$ | 1 | 0 | 0 | 1 | 1 | 0 | 1 | 1 | 0 | 0 | 0 | 1 | 0 | 0 | 0 |
| $E_{24}$ | 0 | 1 | 1 | 0 | X | X | 1 | X | 0 | 0 | 0 | 1 | 0 | 0 | 0 |
| $E_{31}$ | 0 | 1 | 0 | 1 | 0 | 0 | --- | 0 | --- | 0 | 0 | 1 | 0 | 0 | 0 |
| $E_{32}$ | 1 | 0 | 1 | 0 | 0 | 0 | 0 | 0 | 0 | 1 | 1 | 1 | 0 | 1 | 0 |
| $E_{33}$ | 0 | 1 | 0 | 1 | 0 | 0 | 0 | 0 | 1 | 0 | 1 | 1 | 0 | 1 | 0 |
| $E_{34}$ | 1 | 0 | 1 | 0 | X | X | 0 | X | 1 | 0 | 1 | 1 | 0 | 1 | 0 |

| $E_{mn}$ | $Q_{mn}$ | $\overline{Q}_{mn}$ | $A_n$ | $\overline{A}_n$ | $G_{mn}$ $Q_{mn}\cdot\overline{A}_n$ | $H_{mn}$ $\overline{Q}_{mn}\cdot A_n$ | $B_{mn}$ $B^*_{(m-1)n}$ | $B^*_{mn}$ $B_{(m-1)n}\cdot G_{mn}\cdot H_{mn}$ | $C_{mn}$ $C^*_{(m-1)n}$ | $D_{mn}$ $D^*_{m(n-1)}$ | $P_{mn}$ $C_{mn}+D_{mn}$ | $L_{mn}$ $Q_{mn}+\overline{A}_n+B_{mn}$ | $\overline{L}_{mn}$ | $C^*_{mn}$ $L_{mn}\cdot(C_{mn}+D_{mn})$ | $D^*_{mn}$ $\overline{L}_{mn}\cdot(C_{mn}+D_{mn})$ |
|---|---|---|---|---|---|---|---|---|---|---|---|---|---|---|---|
| $E_{41}$ | 1 | 0 | 0 | 1 | 1 | 0 | --- | 0 | --- | 0 | 0 | 1 | 0 | 0 | 0 |
| $E_{42}$ | 0 | 1 | 1 | 0 | 0 | 1 | 0 | 0 | 0 | 0 | 0 | 0 | 1 | 0 | 0 |
| $E_{43}$ | 0 | 1 | 0 | 1 | 0 | 0 | 0 | 0 | 0 | 0 | 0 | 1 | 0 | 0 | 0 |
| $E_{44}$ | 0 | 0 | 1 | 0 | X | X | 0 | X | 0 | 0 | 0 | 0 | 1 | 0 | 0 |
| $E_{51}$ | 1 | 0 | 0 | 1 | 1 | 0 | --- | 0 | --- | 0 | 0 | 1 | 0 | 0 | 0 |
| $E_{52}$ | 1 | 0 | 0 | 1 | 1 | 0 | 1 | 1 | 0 | 0 | 0 | 1 | 0 | 0 | 0 |
| $E_{53}$ | 0 | 1 | 1 | 0 | 0 | 1 | 0 | 1 | 0 | 0 | 0 | 0 | 1 | 0 | 0 |
| $E_{54}$ | 0 | 1 | 1 | 0 | X | X | 1 | X | 0 | 0 | 0 | 1 | 0 | 0 | 0 |
| $E_{61}$ | 1 | 0 | 0 | 1 | 1 | 0 | --- | 0 | --- | 0 | 0 | 1 | 0 | 0 | 0 |
| $E_{62}$ | 1 | 0 | 0 | 1 | 1 | 0 | 0 | 0 | 0 | 0 | 0 | 1 | 0 | 0 | 0 |
| $E_{63}$ | 1 | 0 | 1 | 0 | 0 | 0 | 0 | 0 | 0 | 0 | 0 | 1 | 0 | 0 | 0 |
| $E_{64}$ | 0 | 1 | 1 | 0 | X | X | 0 | X | 0 | 0 | 0 | 0 | 1 | 0 | 0 |

In other words, the $Q_{6n}$ outputs of cells $E_{61}$, $E_{62}$, $E_{63}$ and $E_{64}$ of the sixth word in the memory array are 1, 1, 1 and 0, respectively, indicating that the word 1110 originally in the external memory IN1–IN4 has been written into the last word position of the memory array.

In accordance with the invention, if a priority word of lower priority were to be made available at the external memory IN1 to IN4, this word, upon receipt of the next WRITE signal from generator 17 and triggering by the succeeding clock pulse CL, would be transferred into the fifth word position of the memory array, that is, the memory position immediately above the priority word already in the sixth or last word position of the memory array. This process would be repeated so long as successive priority words were presented to the external memory, in their order of priority, until all word positions of the memory array are filled.

It will now be assumed that the first through sixth word positions of the memory array have been filled with priority words in the following order 0001, 0010, 0101, 0110, 1010, and 1110, and that the priority word loaded into the external memory which is to be written into the memory array is 0111. The manner in which the control level from generator 17 passes through the memory array can be shown by resort to Table V.

directly to the WRITE bus $L_{w4}$ of the word position (fourth position) immediately preceding the word position (fifth position) from which the control signal emanates.

At this time, all other WRITE buses $L_{w1}$ to $L_{w3}$, $L_{w5}$ and $L_{w6}$ will be inactive since none of the cells $E_{41}$, $E_{42}$, $E_{43}$, $E_{44}$ and $E_{64}$ will have C* outputs. With the WRITE bus $L_{w4}$ active, and with ZERO input at line $A_1$, gate IV of cell $E_{41}$ will be enabled, and an input control level will be applied by way of gate S to the K input of flip flop F of cell $E_{41}$. Since the Q output of the flip flop F of cell $E_{51}$ was a ZERO, the K input tot he flip flop of cell $E_{41}$ will not change the state of the flip flop and the Q output will remain a ZERO. Similarly, with a ONE input at lines $A_2$ and $A_3$ feeding cells $E_{42}$ and $E_{43}$ gate III of these cells will be enabled and an input control level will be applied by way of OR gate R of cells $E_{42}$ and $E_{43}$ to the J input of the flip flop of cells $E_{42}$ and $E_{43}$. Since the Q output of the flip flops of cells $E_{42}$ and $E_{43}$ were ONES, the Q input from cells $E_{42}$ and $E_{43}$ will remain ONES. Finally, with a ONE input at line $A_4$ to cell $E_{44}$, gate III of cell $E_{44}$ is enabled and an input level is applied by way of Gate R to the J input of the flip flop of cell $E_{44}$. Since the Q output from the flip flop of cell $E_{44}$ was a ZERO, this flip flop will change state and its Q output will become a ONE. The present Q outputs of cells $E_{41}$, $E_{42}$, $E_{43}$ and $E_{44}$, then, are 0, 1, 1 and 1, respectively. In other words, the word 0111 from the external memory has been written into the fourth word position of the memory array. This obviously is the correct position for the word 0111 since 0111 is of greater weight than the first four words in the memory array (viz., words 0001, 0010, 0101 and 0110) but of lesser weight than the words 1010 and 1110 in word positions five and six of the memory array.

TABLE V

| $E_{mn}$ | $Q_{mn}$ | $\overline{Q}_{mn}$ | $A_n$ | $\overline{A}_n$ | $G_{mn}$ $Q_{mn}\cdot\overline{A}_n$ | $H_{mn}$ $\overline{Q}_{mn}\cdot A_n$ | $B_{mn}$ $B^*_{(m-1)n}$ | $B^*_{mn}$ $B_{(m-1)n}\cdot G_{mn}\cdot H_{mn}$ | $C_{mn}$ $C^*_{(m-1)n}$ | $D_{mn}$ $D^*_{m(n-1)}$ | $P_{mn}$ $C_{mn}+D_{mn}$ | $L_{mn}$ $Q_{mn}+\overline{A}_n+B_{mn}$ | $\overline{L}_{mn}$ | $C^*_{mn}$ $L_{mn}\cdot(C_{mn}+D_{mn})$ | $D^*_{mn}$ $\overline{L}_{mn}\cdot(C_{mn}+D_{mn})$ |
|---|---|---|---|---|---|---|---|---|---|---|---|---|---|---|---|
| $E_{11}$ | 0 | 1 | 0 | 1 | 0 | 0 | ---- | 0 | 1 | ---- | 1 | 1 | 0 | 1 | 0 |
| $E_{12}$ | 0 | 1 | 1 | 0 | 0 | 1 | 0 | 1 | 1 | ---- | 1 | 0 | 1 | 0 | 1 |
| $E_{13}$ | 0 | 1 | 1 | 0 | 0 | 1 | 1 | 1 | 0 | ---- | 0 | 1 | 0 | 0 | 0 |
| $E_{14}$ | 1 | 0 | 1 | 0 | X | X | 1 | X | 0 | ---- | 0 | 1 | 0 | 0 | 0 |
| $E_{21}$ | 0 | 1 | 0 | 1 | 0 | 0 | ---- | 0 | ---- | 0 | 0 | 1 | 0 | 0 | 0 |
| $E_{22}$ | 0 | 1 | 1 | 0 | 0 | 1 | 0 | 1 | 0 | 1 | 1 | 0 | 1 | 0 | 1 |
| $E_{23}$ | 1 | 0 | 1 | 0 | 0 | 0 | 1 | 1 | 0 | 0 | 0 | 1 | 0 | 0 | 0 |
| $E_{24}$ | 0 | 1 | 1 | 0 | X | X | 1 | X | 0 | 0 | 0 | 1 | 0 | 0 | 0 |
| $E_{31}$ | 0 | 1 | 0 | 1 | 0 | 0 | ---- | 0 | ---- | 0 | 0 | 1 | 0 | 0 | 0 |
| $E_{32}$ | 1 | 0 | 1 | 0 | 0 | 0 | 0 | 0 | 0 | 1 | 1 | 1 | 0 | 1 | 0 |
| $E_{23}$ | 0 | 1 | 1 | 0 | 0 | 1 | 0 | 1 | 1 | 0 | 1 | 0 | 1 | 0 | 1 |
| $E_{34}$ | 1 | 0 | 1 | 0 | X | X | 1 | X | 0 | 0 | 0 | 1 | 0 | 0 | 0 |

| $E_{mn}$ | $Q_{mn}$ | $\overline{Q}_{mn}$ | $A_n$ | $\overline{A}_n$ | $G_{mn}$ $Q_{mn}\cdot\overline{A}_n$ | $H_{mn}$ $\overline{Q}_{mn}\cdot A_n$ | $B_{mn}$ $B^*_{(m-1)n}$ | $B^*_{mn}$ $B_{(m-1)n}\cdot G_{mn}\cdot H_{mn}$ | $C_{mn}$ $C^*_{(m-1)n}$ | $D_{mn}$ $D^*_{m(n-1)}$ | $P_{mn}$ $C_{mn}+D_{mn}$ | $L_{mn}$ $Q_{mn}+\overline{A}_n+B_{mn}$ | $\overline{L}_{mn}$ | $C^*_{mn}$ $L_{mn}\cdot(C_{mn}+D_{mn})$ | $D^*_{mn}$ $\overline{L}_{mn}\cdot(C_{mn}+D_{mn})$ |
|---|---|---|---|---|---|---|---|---|---|---|---|---|---|---|---|
| $E_{41}$ | 0 | 1 | 0 | 1 | 0 | 0 | ---- | 0 | ---- | 0 | 0 | 1 | 0 | 0 | 0 |
| $E_{42}$ | 1 | 0 | 1 | 0 | 0 | 0 | 0 | 0 | 0 | 0 | 0 | 1 | 0 | 0 | 0 |
| $E_{32}$ | 1 | 0 | 1 | 0 | 0 | 0 | 0 | 0 | 0 | 1 | 1 | 1 | 0 | 1 | 0 |
| $E_{44}$ | 0 | 1 | 1 | 0 | X | X | 0 | X | 1 | 0 | 1 | 0 | 1 | 0 | 1 |
| $E_{51}$ | 1 | 0 | 0 | 1 | 1 | 0 | ---- | 1 | ---- | 0 | 0 | 1 | 0 | 0 | 0 |
| $E_{52}$ | 0 | 1 | 1 | 0 | 0 | 1 | 1 | 1 | 0 | 0 | 0 | 1 | 0 | 0 | 0 |
| $E_{53}$ | 1 | 0 | 1 | 0 | 0 | 0 | 1 | 1 | 0 | 0 | 0 | 1 | 0 | 0 | 0 |
| $E_{54}$ | 0 | 1 | 1 | 0 | X | X | 1 | X | 0 | 1 | 1 | 1 | 0 | 1 | 0 |
| $E_{61}$ | 1 | 0 | 0 | 1 | 1 | 0 | ---- | 1 | ---- | 0 | 0 | 1 | 0 | 0 | 0 |
| $E_{62}$ | 1 | 0 | 1 | 0 | 0 | 0 | 1 | 1 | 0 | 0 | 0 | 1 | 0 | 0 | 0 |
| $E_{63}$ | 1 | 0 | 1 | 0 | 0 | 0 | 1 | 1 | 0 | 0 | 0 | 1 | 0 | 0 | 0 |
| $E_{64}$ | 0 | 1 | 1 | 0 | X | X | 1 | X | 0 | 0 | 0 | 1 | 0 | 0 | 0 |

The dashes in the table indicate that no physical inputs can exist and the crosses indicate that no physical outputs are possible. For example, there are no D inputs to cells of the first word position, namely, cells $E_{11}$, $E_{12}$, $E_{13}$ and $E_{14}$. For this reason, AND gate P is superfluous. In the case of cell $E_{11}$, the level from signal generator 17 can be applied directly over C line of cell $E_{11}$ to gates X and Y of that cell. In the case of all cells of the first (most significant) bit, except for cell $E_{11}$, there are no C inputs; therefore, any D input can be applied directly to the gates X and Y of that cell. In the case of all cells of the fourth (least significant) bit, there is no need for a block level B*; consequently, gates G, H, and Z may be omitted and the absence of any output therefrom is indicated in the Table V by the crosses. It can be seen from Table V that the control signal level appears successively at the C* output of cell $E_{11}$, the D* output of cell $E_{12}$, the D* output of cell $E_{22}$, the C* output of cell $E_{32}$, the D* output of cell $E_{33}$, the C* output of cell $E_{43}$, the D* output of cell $E_{44}$ and the C* output of cell $E_{54}$. The path through the memory array is indicated by the heavy dashed line. The control signal at output line C* of cell $E_{54}$ is applied Since the word 0111 from the external memory has been written into the fourth word position, it obviously is necessary to shift up the words in the first four word positions of the memory array. This is accomplished by energizing the SHIFT UP buses $L_{u4}$, $L_{u3}$, $L_{u2}$ and $L_{u1}$. The control level emanating from the C* line $C^*_{54}$ of cell $E_{54}$ passes OR gage U2 enroute to SHIFT UP bus $L_{u5}$ of the third word position of the memory array. This C* output of cell $E_{54}$ also passes through OR gates U2 and U3 enroute to SHIFT UP bus $L_{u2}$ of the second word position of the memory array and via OR gates U2, U3 and U4 to the SHIFT UP bus $L_{u1}$ of the first word position.

The Tables VIII and IX indicate, by way of example, that, for an external word 0101 and a priority word 0101 already in the third word position of the memory array, the control level from generator 17 will proceed across cell $E_{11}$ to cell $E_{12}$, down cell $E_{12}$ to cell $E_{22}$, down cell $E_{22}$ to cell $E_{32}$, across cell $E_{32}$ to cell $E_{33}$, across cell $E_{33}$ to cell $E_{34}$ and across cell $E_{34}$ to the C* output line thereof. The control level from generator 17 then appears on the WRITE bus $L_{w2}$ of the second word position of the memory array. Upon arrival of the next clock pulse CL to the flip flops of cells $E_{21}$, $E_{22}$, $E_{23}$ and $E_{24}$, these flip flops will be actuated and the word 0101 from the external memory will be written into the second word position. Likewise, the control level from the C* line of cell $E_{34}$ will pass through gate U4 to the SHIFT UP line $L_{u1}$ of the first word position to shift the word 0010 formerly in the second word position to the first word position and, in effect, shifting the word 0001 off the memory array.

This completes the description of the preferred embodiment of the invention illustrated herein. However, many modifications thereof will be apparent to those skilled in the art. Accordingly, it is desired that the invention not be limited by the particular details of the embodiment described herein except as defined by the accompanying claims.

What is claimed is:

1. A priority sequencing device comprising a *priority* memory array having a storage capacity of *m* priority words, said memory array including *mn* cells where *m* is the number of priority word positions in said array and *n* is the number of priority bits per memory word, external storage means into which is loaded an external priority word to be presented to said memory array, means for applying a control level to the cell of the lowest priority memory word position and of the most significant bit, said cells each including logic circuitry for controlling the path through the cells of said memory array taken by said control level and also the memory word position from which said control level emanates from said memory array in accordance with the relative priority of the aforesaid memory words.

2. A priority sequencing device according to claim 1 wherein the memory cells except those for the least siginificant bit each have a first output line connected to the cells of the same memory word position and of the bit of next lower significance, and the memory cells except those for the memory word position of lowest priority having a second output line connected to the cell of the same bit and of the memory word position of next higher priority.

3. A priority sequencing device according to claim 2 further including a set of execution command lines for the cells of each of said memory word positions, the control level emanating from said array energizing one of said command lines of the immediately preceding memory word positions for writing said external words into the latter position, and the control level emanating from said array energizing another of said command lines of all memory word positions preceding the memory word position written into for shifting the contents of all said preceding memory word positions to an adjacent memory word position nearer the external storage means.

4. A priority sequencing device according to claim 3 further including means for deriving a block level at a cell of a given bit in the memory array and at cells of bits of lower significance in the same memory word position wherein said given bit disagrees with the corresponding bit of the word in the external memory, said block level preventing transfer of said control level to said second output line.

5. A priority sequencing device according to claim 4 further including means for transferring said control level incident on a cell of a given bit to the first output line thereof when the corresponding bit of the external word is a zero, and means for transferring said control level incident on a cell of a given bit to the second output line thereof when the corresponding bit of the external word is a ONE and when there is no block level at said cell.

6. A priority sequencing device according to claim 1 further including a set of execution command lines for the cells of each of said memory word positions, the control level emanating from said array energizing one of said command lines of the immediately preceding memory word positions for writing said external words into the latter position, and the control level emanating from said array energizing another of said command lines of all memory word positions preceding the memory word position written into for shifting the contents of all said preceding memory word positions to an adjacent memory word position nearer the external storage means.

7. A priority sequencing device according to claim 6 further including means for deriving a block level at a cell of a given bit in the memory array and at cells of bits of lower significance in the same memory word position wherein said given bit disagrees with the corresponding bit of the word in the external memory, said block level preventing transfer of said control level to said second output line.

8. A priority sequencing device according to claim 7 further including means for transferring said control level incident on a cell of a given bit to the first output line thereof when the coresponding bit of the external word is a zero, and means for transferring said control level incident on a cell of a given bit to the second output line thereof when the corresponding bit of the external word is a ONE and when there is no block level at said cell.

References Cited

UNITED STATES PATENTS

| | | | |
|---|---|---|---|
| 3,234,524 | 2/1966 | Roth | 340—172.5 |
| 3,300,766 | 1/1967 | Koerner et al. | 340—172.5 X |

BERNARD KONICK, Primary Examiner

J. F. BREIMAYER, Assistant Examiner

UNITED STATES PATENT OFFICE
CERTIFICATE OF CORRECTION

Patent No. 3,493,939 February 3, 1970

Robert M. Dunn et al.

It is certified that error appears in the above identified patent and that said Letters Patent are hereby corrected as shown below:

Column 6, line 49, "at" should read -- from --; same line 49, after "$E_{mn}$" cancel the comma and insert -- . If a B input is obtained at cell $E_{mn}$, --; line 63, after "gate" insert -- X --. Column 7, in the heading to TABLE II, "Resulting" should read -- Resulting Q --; same column 7, in the heading to TABLE III, "Q(m-1)n" should read -- $\bar{Q}_{(m-1)n}$ --. Columns 9 and 10, TABLE V, bottom portion, column 1, line 3 thereof, "$E_{32}$" should read -- $E_{43}$ --. Columns 11 and 12, TABLE IX, bottom portion: In the column headed $Q_{mn}$, change the digit for $E_{52}$ from "1" to -- 0 -- and the digit for $E_{53}$ from "0" to -- 1 --; in the column headed $\bar{Q}_{mn}$, change the digit for $E_{52}$ from "0" to -- 1 -- and the digit for $E_{53}$ from "1" to -- 0 --. In the column headed $A_n$, for $E_{52}$, change "0" to -- 1 --; for $E_{53}$, change "1" to -- 0 --; for $E_{62}$, change "0" to -- 1 --; for $E_{63}$, change "1" to -- 0 --. In the column headed $\bar{A}_n$, for $E_{52}$, change "1" to -- 0 --; for $E_{53}$, change "0" to -- 1 --; for $E_{62}$, change "1" to -- 0 --; for $E_{63}$, change "0" to -- 1 --. In the column headed $G_{mn}$, for $E_{52}$, change "1" to -- 0 --; for $E_{53}$, change "0" to -- 1 --; for $E_{62}$, change "1" to -- 0 --; for $E_{63}$, change "0" to -- 1 --. In the column headed $H_{mn}$, for $E_{52}$, change "0" to -- 1 --; for $E_{53}$, change "1" to -- 0 --. In the column headed $B_{mn}$, for $E_{52}$, change "1" to -- 0 --; for $E_{53}$, change "0" to -- 1 --. In the column headed $L_{mn}$, for $E_{52}$, change "1" to -- 0 --; for $E_{53}$, change "0" to -- 1 --. In the column headed $\bar{L}_{mn}$, for $E_{52}$, change "0" to -- 1 --; for $E_{53}$, change "1" to -- 0 --.

Signed and sealed this 22nd day of December 1970.

(SEAL)
Attest:

EDWARD M. FLETCHER, JR.
Attesting Officer

WILLIAM E. SCHUYLER, JR.
Commissioner of Patents